(12) United States Patent
Suzuki et al.

(10) Patent No.: US 11,137,321 B2
(45) Date of Patent: Oct. 5, 2021

(54) FAILURE DIAGNOSIS SYSTEM

(71) Applicant: SUMITOMO HEAVY INDUSTRIES, LTD., Tokyo (JP)

(72) Inventors: Kota Suzuki, Aichi (JP); Mikio Komatsu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 285 days.

(21) Appl. No.: 16/253,671

(22) Filed: Jan. 22, 2019

(65) Prior Publication Data

US 2019/0242787 A1     Aug. 8, 2019

(30) Foreign Application Priority Data

Feb. 5, 2018  (JP) .............................. JP2018-018329

(51) Int. Cl.
| | |
|---|---|
| *G01M 15/00* | (2006.01) |
| *G01M 15/12* | (2006.01) |
| *G01M 7/02* | (2006.01) |
| *G01M 13/028* | (2019.01) |
| *G01M 13/045* | (2019.01) |

(52) U.S. Cl.
CPC .............. *G01M 15/12* (2013.01); *G01M 7/02* (2013.01); *G01M 13/028* (2013.01); *G01M 13/045* (2013.01)

(58) Field of Classification Search
CPC ...... G01M 15/12; G01M 7/02; G01M 13/028; G01M 13/045; G01M 15/00; G07C 5/0825; G01R 31/34; G01H 17/00
See application file for complete search history.

(56) References Cited

U.S. PATENT DOCUMENTS 7,079,979 B2    7/2006 Fukui
9,477,223 B2 *  10/2016 Shaikh .............. G05B 23/0272
(Continued)

FOREIGN PATENT DOCUMENTS

CN    201306219 Y     9/2009
CN    101614583 A    12/2009
(Continued)

OTHER PUBLICATIONS

Office Action issued in Japanese Patent Application No. 2018-018329, dated Jun. 8, 2021.

*Primary Examiner* — Freddie Kirkland, III
(74) *Attorney, Agent, or Firm* — Michael Best & Friedrich LLP

(57) ABSTRACT

A failure diagnosis system includes a sensor that detects diagnosis target information of a diagnosis target device; a setting portion that sets a type of a determination value based on the diagnosis target information to be used for determination of whether an abnormality occurs in the diagnosis target device; and a diagnosis unit including a determination portion that determines whether the abnormality occurs in the diagnosis target device on the basis of the determination value of the type set by the setting portion. The diagnosis unit includes a first interface that outputs a determination result in the determination portion to a first external device, and a second interface that outputs a determination value of a type that is not set by the setting portion in addition to the determination value of the type set by the setting portion to a second external device.

9 Claims, 6 Drawing Sheets

(56) References Cited

U.S. PATENT DOCUMENTS

| | | | |
|---|---|---|---|
| 10,339,785 B2* | 7/2019 | Suzuki | G05B 19/4184 |
| 2005/0114081 A1 | 5/2005 | Fukui | |
| 2006/0036403 A1* | 2/2006 | Wegerich | G06K 9/00536 |
| | | | 702/183 |
| 2007/0252734 A1* | 11/2007 | Greiner | E02F 9/26 |
| | | | 341/67 |
| 2013/0073260 A1* | 3/2013 | Maeda | G05B 23/0224 |
| | | | 702/183 |
| 2013/0282336 A1* | 10/2013 | Maeda | G05B 23/02 |
| | | | 702/184 |
| 2017/0102295 A1* | 4/2017 | Komatsu | G01M 15/04 |
| 2017/0261403 A1* | 9/2017 | Hiruta | G01M 15/14 |
| 2018/0059656 A1* | 3/2018 | Hiruta | G05B 23/0267 |

FOREIGN PATENT DOCUMENTS

| | | |
|---|---|---|
| CN | 201886129 U | 6/2011 |
| CN | 103115667 A | 5/2013 |
| CN | 103807429 A | 5/2014 |
| CN | 105467319 A | 4/2016 |
| CN | 106537111 A | 3/2017 |
| CN | 106662856 A | 5/2017 |
| CN | 107036708 A | 8/2017 |
| CN | 107269518 A | 10/2017 |
| JP | 2005-121639 A | 5/2005 |
| JP | 2005-343002 A | 12/2005 |
| JP | 2015-157695 A | 9/2015 |
| JP | 2017-075795 A | 4/2017 |
| JP | 2017-181138 A | 10/2017 |
| KR | 2016-0103734 A | 9/2016 |
| KR | 2017-0018586 A | 2/2017 |

\* cited by examiner

FAILURE DIAGNOSIS SYSTEM

RELATED APPLICATIONS

Priority is claimed to Japanese Patent Application No. 2018-018329, filed Feb. 5, 2018, the entire content of which is incorporated herein by reference.

BACKGROUND

Technical Field

Certain embodiments of the present invention relate to a failure diagnosis system.

Description of Related Art

A failure diagnosis system for detecting failure of a device such as a motor, a gear motor, or a gear box, for example, is known. The failure diagnosis system generally includes a sensor that is disposed in a diagnosis target device, and a processing unit that determines whether an abnormality occurs in the diagnosis target device on the basis of information from the sensor.

SUMMARY

There is a need for providing a failure diagnosis system with high convenience.

According to an embodiment of the present invention, there is provided a failure diagnosis system including: a sensor that detects diagnosis target information of a diagnosis target device; a setting portion that sets a type of a determination value based on the diagnosis target information to be used for determination of whether an abnormality occurs in the diagnosis target device; and a diagnosis unit including a determination portion that determines whether the abnormality occurs in the diagnosis target device on the basis of the determination value of the type set by the setting portion, in which the diagnosis unit includes a first output portion that outputs a determination result in the determination portion to a first external device, and a second output portion that outputs a determination value of a type that is not set by the setting portion in addition to the determination value of the type set by the setting portion to a second external device.

Any combination of the above-mentioned components and mutual replacements of components or expressions of the invention between methods, apparatuses, systems, and the like is also effective as an embodiment of the invention.

According to the present invention, it is possible to provide a failure diagnosis system with high convenience.

DETAILED DESCRIPTION

Figure 1:
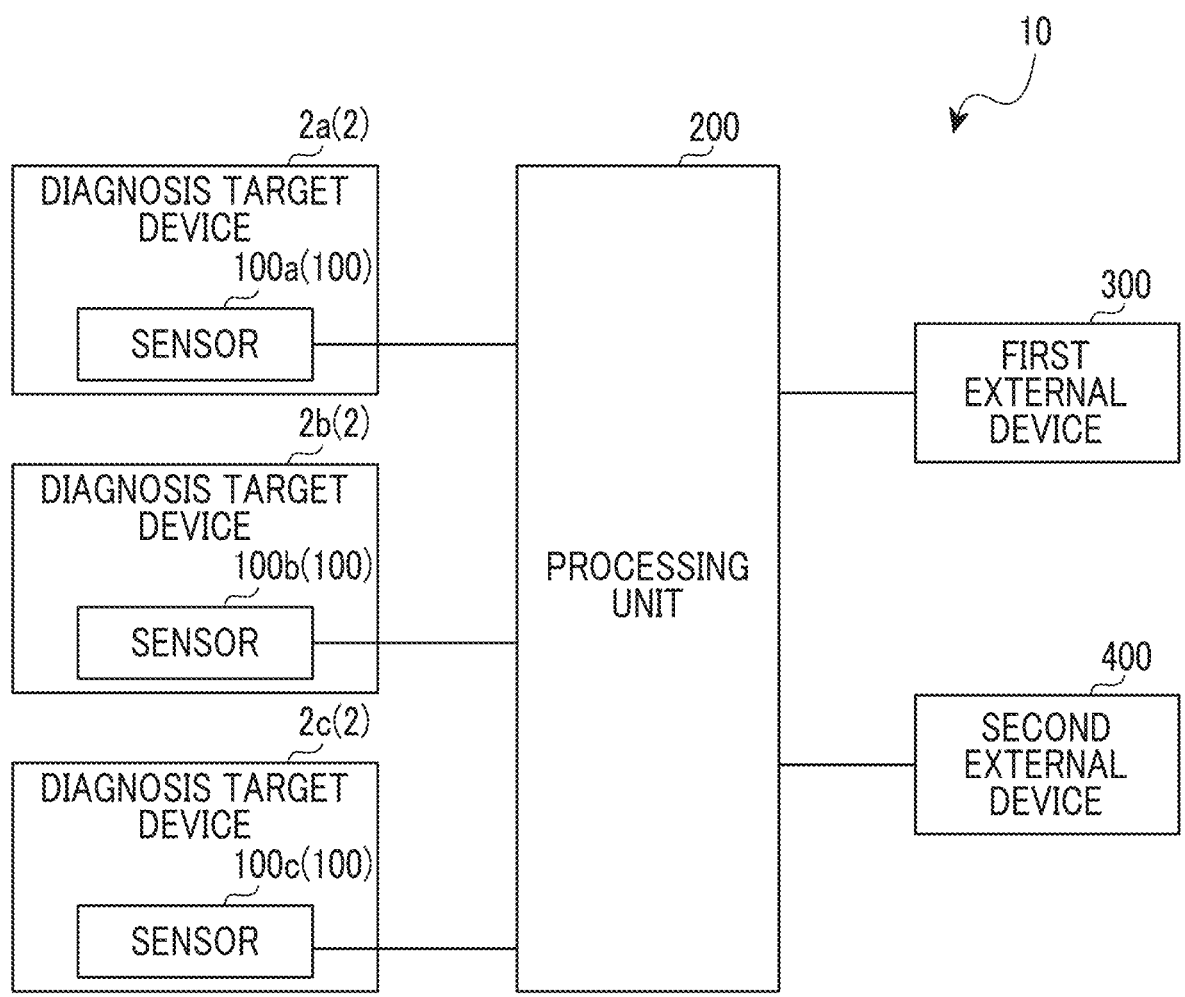
FIG. 1 is a schematic diagram showing a configuration of a failure diagnosis system according to an embodiment of the invention.

Hereinafter, the same reference numerals are given to the same or equivalent components, members, and processes shown in respective drawings, and repetition of description will be appropriately avoided. Further, dimensions of the members in the respective drawings are appropriately enlarged or reduced for ease of understanding. In addition, in description of embodiments in the respective drawings, a part of unimportant members are not shown.

FIG. 1 is a schematic diagram showing a configuration of a failure diagnosis system 10 according to an embodiment. The failure diagnosis system 10 detects an abnormality of gear motors 2a, 2b, and 2c that are generally referred to as gear motors 2, and supports analysis thereof. The failure diagnosis system 10 may also be used for detecting an abnormality of a diagnosis target device other than the gear motor 2, such as a motor, a gear box, an engine, a machine tool, an injection molding machine, or the like, for example.

The failure diagnosis system 10 includes sensors 100a, 100b, and 100c that are generally referred to as sensors 100, a processing unit (diagnosis unit) 200, a first external device 300, and a second external device 400.

The sensors 100a, 100b, and 100c are respectively attached to the gear motors 2a, 2b, and 2c, and are connected to the processing unit 200 in a wired manner. The sensors 100 are vibration sensors in this embodiment. Each sensor 100 detects vibration that is generated in a corresponding gear motor 2, generates vibration information (diagnosis target information) indicating the magnitude of the vibration, and transmits the result to the processing unit 200. In FIG. 1, one sensor 100 is attached to each gear motor 2, but the number of sensors 100 attached to each gear motor 2 is not particularly limited. The number of sensors 100 attached to a certain gear motor 2 and the number of sensors 100 attached to another gear motor 2 may be different from each other. Further, an attachment position of the sensor 100 in the gear motor 2 may be set by determining a position suitable for detection of an abnormality through an experiment, a simulation, or the like.

The first external device 300 is an external device that is connected to a first interface 201 (which will be described later) of the processing unit 200. The first external device 300 is a control management device for controlling the gear motor 2, for example, and a programmable logic controller (PLC) may be used as an example thereof.

The second external device 400 is an external device that is connected to a second interface 202 (which will be described later) of the processing unit 200. The second external device 400 is an information processing terminal such as a PC, for example. The second external device 400 may handle information larger than that of the first external device 300.

The processing unit 200 repeatedly executes a "diagnosis process" of determining whether an abnormality occurs in the gear motor 2 on the basis of vibration information transmitted from each sensor 100. Further, the processing unit 200 transmits a determination result or the like to the first external device 300 or the second external device 400. A user may check the determination result or the like transmitted to the first external device 300 or the second external device 400, to thereby understand that the abnormality occurs in the gear motor 2.

Figure 2:
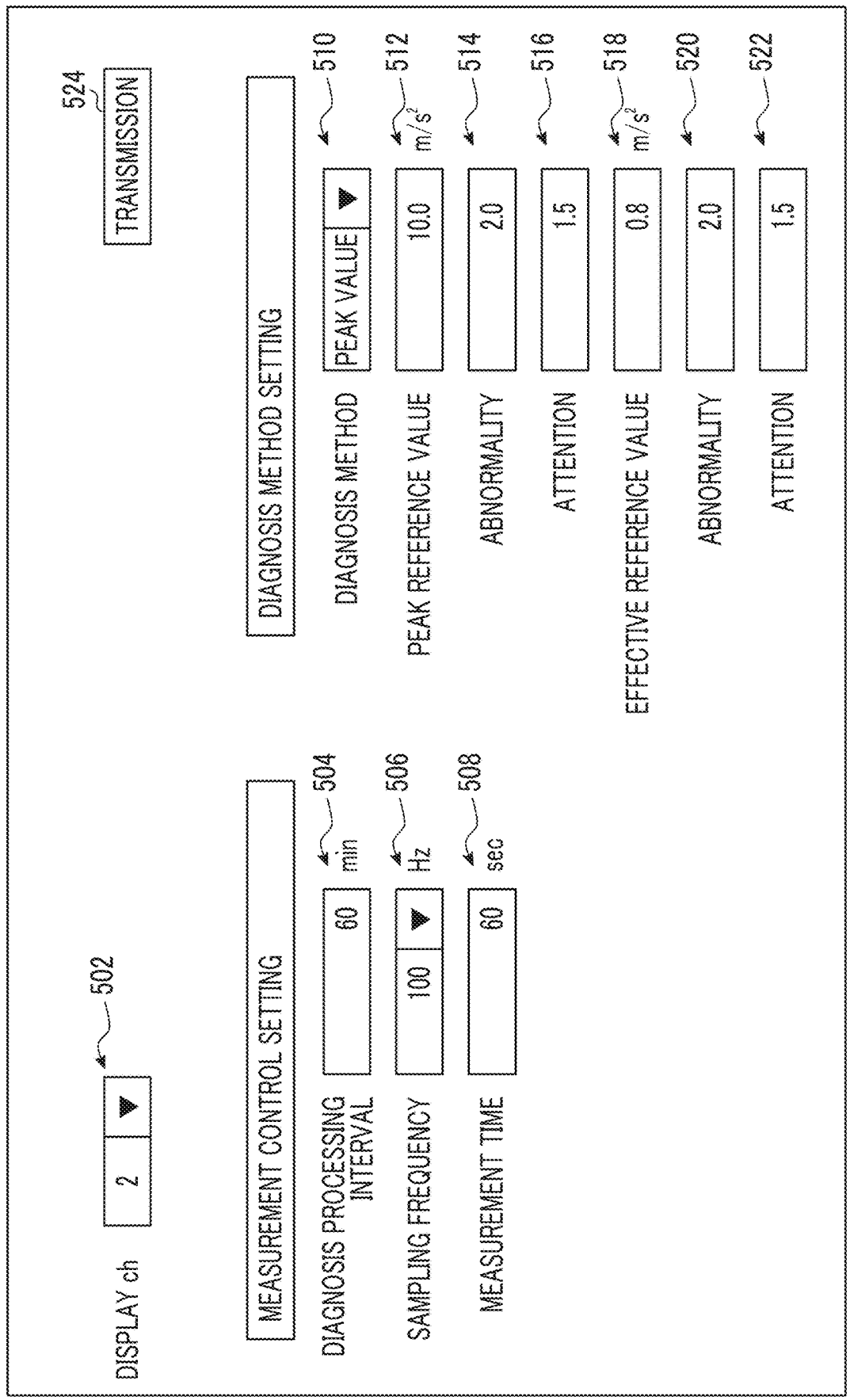
FIG. 2 is a diagram showing a diagnosis setting screen.

FIG. 2 shows a diagnosis setting screen provided by the failure diagnosis system 10. The diagnosis setting screen is a screen for setting setting information (hereinafter, referred to as "diagnosis setting information") relating to a diagnosis process. In this embodiment, as described later, the second external device 400 provides the diagnosis setting screen.

A channel to which a sensor 100 for diagnosis setting is connected is input (selected) in a display ch section 502. An interval for executing the diagnosis process is input in a diagnosis process interval section 504. A frequency at which the processing unit 200 acquires the vibration information transmitted from the sensor 100 is input in a sampling frequency section 506. A period of time for which the processing unit 200 acquires the vibration information in one diagnosis process is input in a measurement time section 508. In other words, how much time is taken for the vibration information used in one diagnosis process is input in the measurement time section 508.

A diagnosis method is input (selected) in a diagnosis method selection section 510. In this embodiment, "none", "peak value diagnosis", "effective value diagnosis", or "both" may be selected. In the peak value diagnosis, it is determined whether an abnormality occurs in the gear motor 2 on the basis of the size of a peak value of vibration indicated by vibration information. The peak value means a distance between a maximum value and a minimum value in amplitude within the measurement time. In the effective value diagnosis, it is determined whether an abnormality occurs in the gear motor 2 on the basis of the size of the effective value of the vibration indicated by the vibration information. The effective value means a square mean of vibration within the measurement time.

A reference value for determining a peak value abnormality threshold and an attention threshold (which is smaller than the peak value abnormality threshold) is input in a peak reference value section 512. A peak value (for example, an average value of peak values in a predetermined number of diagnosis processes) when there is no abnormality in the gear motor 2 may be set in the peak reference value section 512. In a peak value abnormality section 514, and an attention section 516, the peak value abnormality threshold and the attention threshold are input as multiples of the peak reference value. That is, the multiples of the peak reference value at which the peak value shows an abnormality and an attention are input in the peak value abnormality section 514 and the attention section 516. In the example shown in FIG. 2, 10.0 (m/S$^2$) is input in the peak reference value section 512, 2.0 (times) is input in the peak value abnormality section 514, and 1.5 (times) is input in the attention section 516. Accordingly, the peak value abnormality threshold becomes 20.0 (m/S$^2$), and the attention threshold becomes 15.0 (m/S$^2$).

A reference value for determining an effective value abnormality threshold and an attention threshold (which is smaller than the effective value abnormality threshold) is input in an effective reference value section 518. An effective value (for example, an average value of effective values in a predetermined number of diagnosis processes) when there is no abnormality in the gear motor 2 may be set in the effective reference value section 518. In an effective value abnormality section 520, and an attention section 522, the effective value abnormality threshold and the attention threshold are input as multiples of the effective reference value. That is, the multiples of the effective reference value at which the effective value shows an abnormality and an attention are input in the effective value abnormality section 520 and the attention section 522. In the example shown in FIG. 2, 0.8 (m/S$^2$) is input in the effective reference value section 518, 2.0 (times) is input in the effective value abnormality section 520, and 1.5 (times) is input in the attention section 522. Accordingly, the effective value abnormality threshold becomes 1.6 (m/S$^2$), and the attention threshold becomes 1.2 (m/S$^2$).

Figure 3:
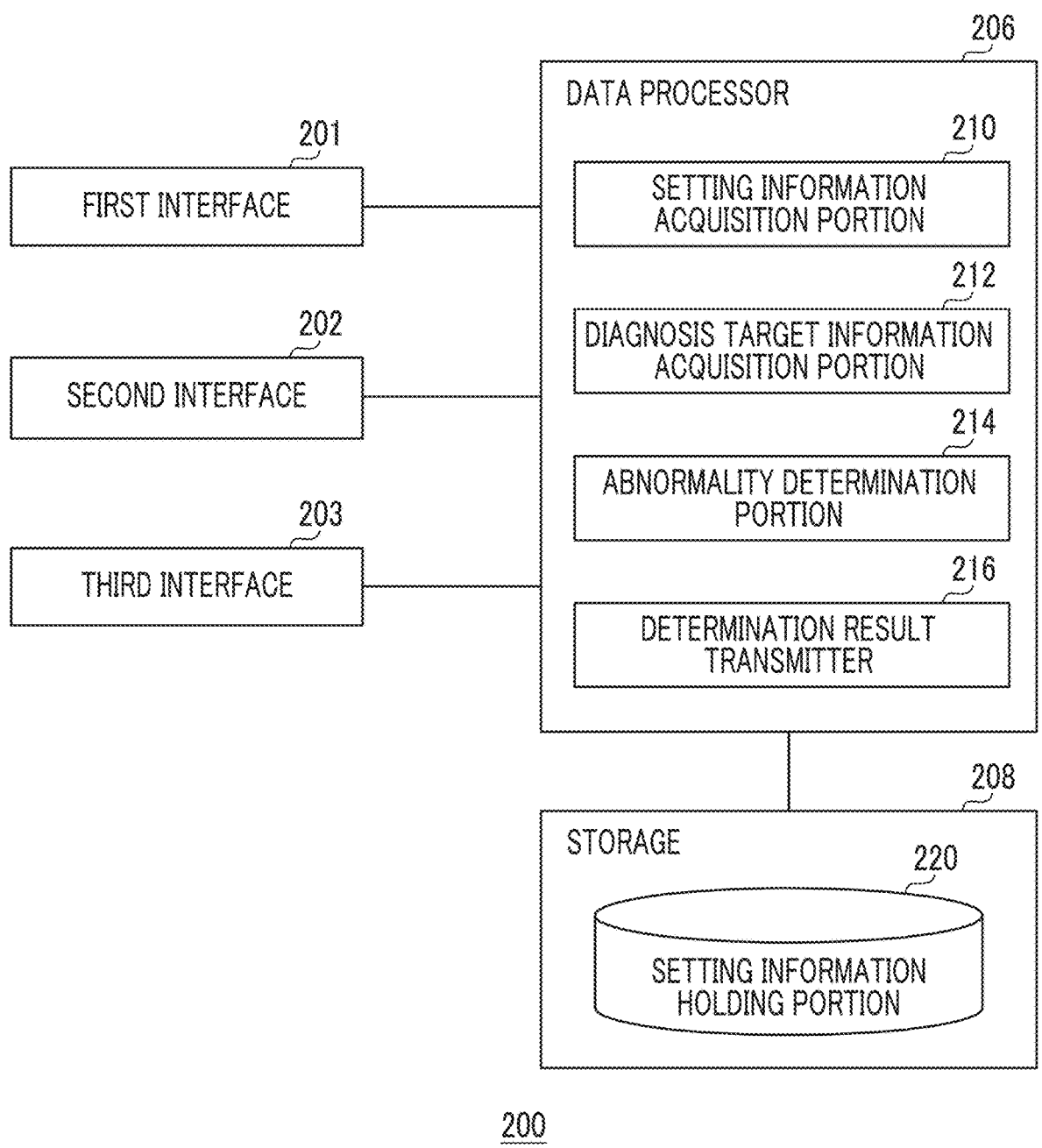
FIG. 3 is a block diagram showing a function and a configuration of a processing unit shown in FIG. 1.

FIG. 3 is a block diagram showing a function and a configuration of the processing unit 200. The respective blocks may be realized by elements such as a CPU and a memory of a computer, or a mechanical device in the form of hardware, and may be realized by a computer program or the like in the form of software, in which functional blocks realized through cooperation therebetween are shown. Accordingly, it is obvious for those skilled in the art that the functional blocks can be realized in various forms by combination of hardware and software. This is similarly applied to subsequent other block diagrams.

The processing unit 200 includes the first interface 201 that is a first output portion, the second interface 202 that is a second output portion, a third interface 203, a data processor 206 for executing a diagnosis process, and a storage 208 for storing a variety of data for data processing of the data processor 206.

The first interface 201 is an interface for performing communication of a digital signal level with a device having a digital I/O. The first interface 201 is connected to the first external device 30. The second interface 202 is an interface for performing network communication, and an Ethernet (registered trademark) adaptor or a wireless LAN adaptor may be used as an example thereof. The second interface 202 is connected to the second external device 40. The third interface 203 is an interface for performing communication with each sensor 100.

The storage 208 includes a setting information holding portion 220. The setting information holding portion 220 holds a setting value of each setting item shown in FIG. 2, for each channel.

The data processor 206 includes a setting information acquisition portion 210, a diagnosis target information acquisition portion 212, an abnormality determination portion 214, and a determination result transmitter 216. The setting information acquisition portion 210 acquires diagnosis setting information transmitted from the second external device 400, and registers the information in the setting information holding portion 220. The diagnosis target information acquisition portion 212 acquires vibration information for a set measurement time at a set sampling frequency at a set diagnosis processing interval from each sensor 100.

The abnormality determination portion 214 determines whether an abnormality occurs in the gear motor 2 on the basis of diagnosis target information acquired from each sensor 100.

First, the abnormality determination portion 214 specifies both of a peak value and an effective value from vibration information, regardless of which diagnosis method is selected in diagnosis setting information. That is, the abnormality determination portion 214 specifies both of the peak value and the effective value from the vibration information, in a case where "none", "peak value" or "effective value" is set in the diagnosis method, in addition to a case where "both" are set in the diagnosis method.

Then, the abnormality determination portion 214 determines whether an abnormality occurs in the gear motor 2 using a diagnosis method set by diagnosis setting information. Specifically, the determination is performed as follows.

In a case where "none" is set in the diagnosis method, the abnormality determination portion 214 does not execute the determination of whether an abnormality occurs in the gear motor 2.

In a case where the "peak value" is set in the diagnosis method, the abnormality determination portion 214 determines that an abnormality occurs in the gear motor 2 in a case where the size of the peak value specified from the vibration information exceeds an abnormality threshold.

In a case where the "effective value" is set in the diagnosis method, the abnormality determination portion 214 determines that an abnormality occurs in the gear motor 2 in a case where the size of the effective value specified from the vibration information exceeds an abnormality threshold.

In a case where the "both" is set in the diagnosis method, the abnormality determination portion 214 determines that an abnormality occurs in the gear motor 2, in a similar way to the case where the peak value or the effective value is set. In this case, it may be determined that there is an abnormality in a case where it is determined that an abnormality occurs in the gear motor 2 using at least one diagnosis method among the peak value diagnosis and the effective value diagnosis, or it may be determined that there is an abnormality only in a case where it is determined that an abnormality occurs using both the diagnosis methods.

Hereinafter, the peak value and the effective value specified from the vibration information by the abnormality determination portion 214 are referred to as "determination values".

The determination result transmitter 216 outputs the determination result of the abnormality determination portion 214 to the first interface 201, that is, transmits the determination result to the first external device 300. Specifically, in a case where "none" is set in the diagnosis method, the determination result transmitter 216 does not output the determination result to the first interface 201. Further, in a case where "peak value diagnosis" is set in the diagnosis method, the determination result transmitter 216 outputs the determination result based on the peak value diagnosis to the first interface 201. Further, in a case where "effective value diagnosis" is set in the diagnosis method, the determination result transmitter 216 outputs the determination result based on the effective value diagnosis to the first interface 201. Furthermore, in a case where "both" is set, the determination result transmitter 216 outputs a determination result obtained by the determination result based on the peak diagnosis and the determination result based on the effective value diagnosis to the first interface 201.

Further, the determination result transmitter 216 outputs a determination value of a diagnosis method that is not set, in addition to the determination value of the set diagnosis method, to the second interface 202 together with a channel to which the sensor 100 that detects vibration information that is a basis of the determination values is connected and determination execution date and time, that is, transmits them to the second external device 400. That is, the determination result transmitter 216 outputs both of the peak value and the effective value to the second interface 202, regardless of which diagnosis method is set by diagnosis setting information. The determination result transmitter 216 may output the determination result in addition to the peak value and the effective value. Accordingly, even in a case where "none" is set in the diagnosis method, for example, the determination result transmitter 216 outputs the peak value and the effective value to the second interface 202.

Figure 4:
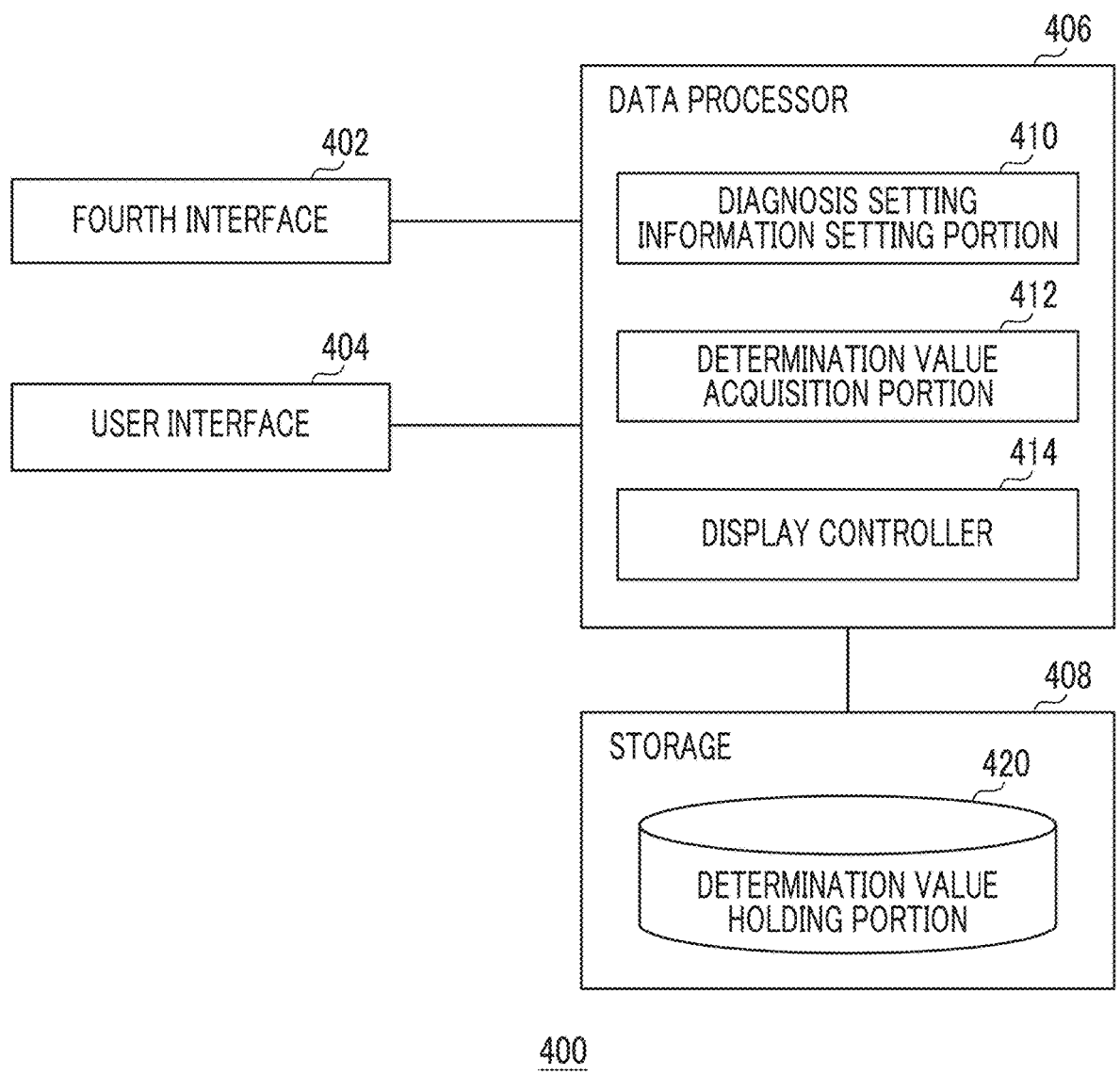
FIG. 4 is a block diagram showing a function and a configuration of a second external device shown in FIG. 1.

FIG. 4 is a block diagram showing a function and a configuration of the second external device 400. The second external device 400 includes a fourth interface 402, a user interface 404, a data processor 406, and a storage 408.

The fourth interface 402 is an interface for performing network communication, and an Ethernet (registered trademark) adaptor or a wireless LAN adaptor may be used as an example thereof. The fourth interface 402 is connected to the processing unit 200. The user interface 404 receives an operation input from a user, and causes a display to display various screens in accordance with commands from the data processor 406.

The storage 408 includes a determination value holding portion 420. The determination value holding portion 420 holds a determination value, a channel, and determination date and time in association.

The data processor 406 executes a variety of data processing on the basis of data acquired from the fourth interface 402 and the user interface 404. The data processor 406 includes a diagnosis setting information setting portion 410, a determination value acquisition portion 412, and a display controller 414.

In a case where a transmission button 524 is pressed on the diagnosis setting screen shown in FIG. 2, the diagnosis setting information setting portion 410 sets a setting value of each setting item input on the diagnosis setting screen as diagnosis setting information. Specifically, the diagnosis setting information setting portion 410 transmits the setting value of each setting item to the processing unit 200, and records the setting value of each setting item on the setting information holding portion 220. Further, the diagnosis setting information setting portion 410 also records the setting value of each setting item on the storage 408.

The determination value acquisition portion 412 acquires the determination value, the channel, and the determination data and time transmitted from the processing unit 200, and records them on the determination value holding portion 420.

In a case where a predetermined operation input is received from a user, the display controller 414 causes a display to displays various screens. For example, the display controller 414 causes the display to display the diagnosis setting screen, the diagnosis result screen, and the diagnosis trend screen shown in FIG. 2.

Figure 5:
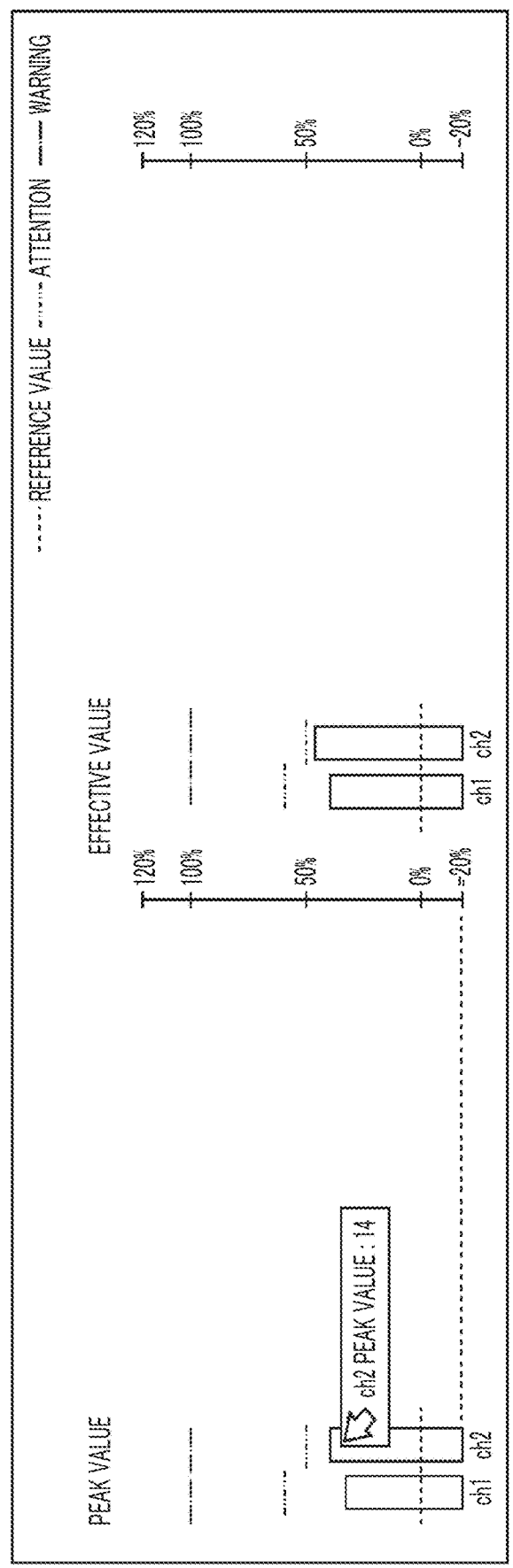
FIG. 5 is a diagram showing a diagnosis result screen.

FIG. 5 shows a diagnosis result screen. On a left side of the diagnosis result screen, a peak value based on vibration information from the sensor 100 connected to each channel is displayed as a bar graph. Specifically, when a peak reference value is set to 0% and an abnormality value is set to 100%, peak values are shown as proportions with respect to the peak reference value and the abnormality value. On a right side of the diagnosis result screen, an effective value based on the vibration information from the sensor 100 connected to each channel is displayed as a bar graph. Specifically, when an effective reference value is set to 0% and an abnormality value is set to 100%, effective values are shown as proportions with respect to the effective reference value and the abnormality value.

Further, on the diagnosis result screen, in a case where a pointer (mouse cursor) is pointed to a bar graph of a certain channel peak value, the peak value of the channel is displayed in a pop-up form, and in a case where the pointer is pointed to a bar graph of an effective value of a certain channel, the effective value of the channel is displayed in a pop-up form.

Figure 6:
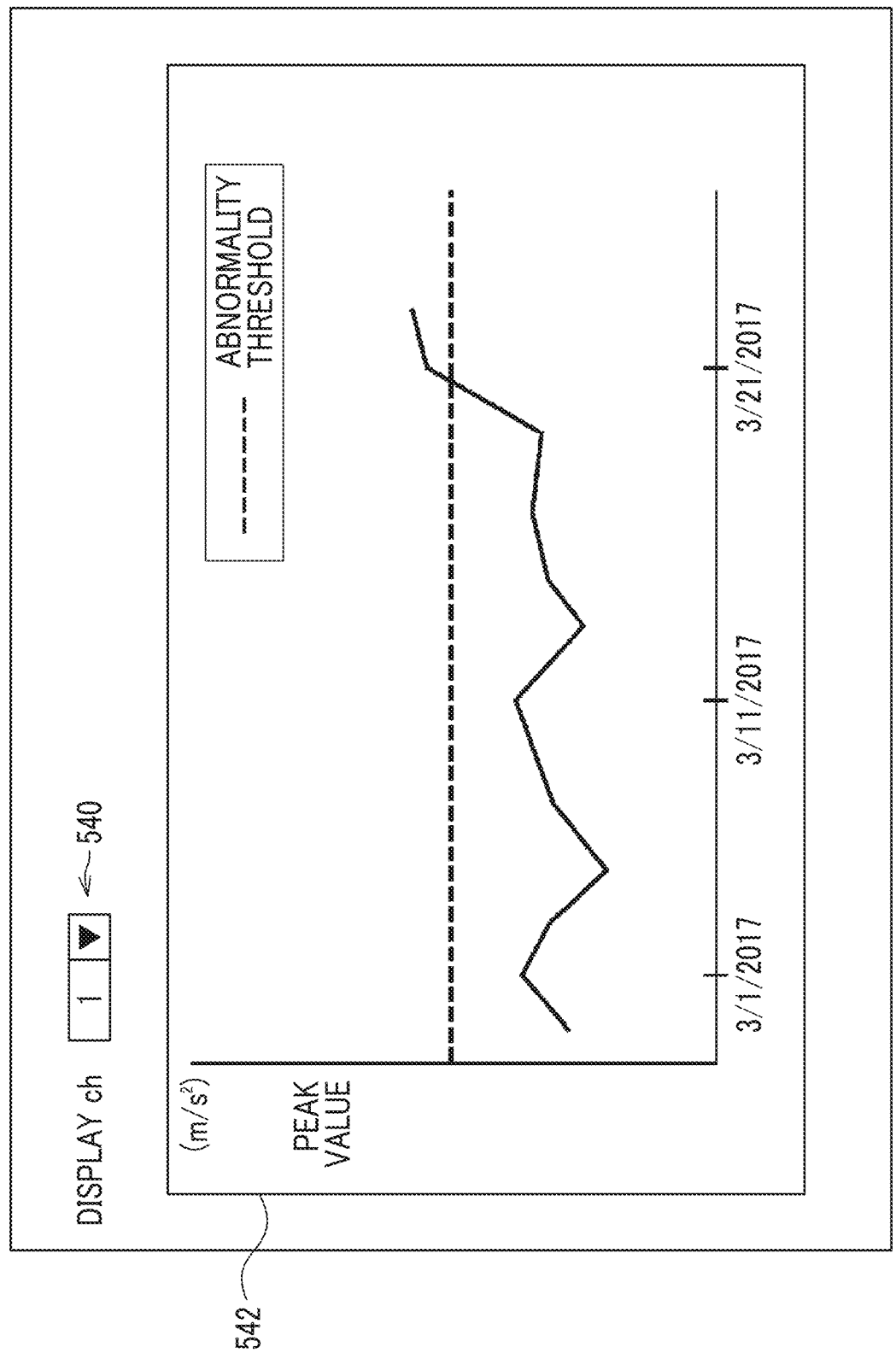
FIG. 6 is a diagram showing a diagnosis trend screen.

FIG. 6 shows a diagnosis trend screen. In a display ch section 540, a channel corresponding to a sensor 100 for displaying a trend graph (temporal change) of a determination value is input (selected). As a graph 542, a trend graph corresponding to the selected channel is displayed. Specifically, the display controller 414 displays determination values for a predetermined period of time (for example, for latest 30 days) among determination values of the channel selected in the display ch section 540, on the graph 542, as a trend graph, with reference to the determination value holding portion 420. In FIG. 6, a trend graph of a peak value is displayed, but a trend graph of an effective value may be similarly displayed.

An operation of the failure diagnosis system 10 configured as described above will be described.

A user inputs diagnosis setting information on the diagnosis setting screen in FIG. 2. The second external device 400 sets a setting value of each setting item shown in FIG. 2 as diagnosis setting information. In a case where a predetermined start command is received, the processing unit 200 acquires vibration information at a set sampling frequency, at each diagnosis processing interval set by the diagnosis setting information, for a set measurement time, from each sensor 100. Further, the processing unit 200 determines whether an abnormality occurs in the gear motor 2, on the basis of the acquired vibration information. The processing unit 200 outputs a determination result based on a diagnosis method set by the diagnosis setting information to the first interface 201, to then transmit the determination result to the first external device 300. The first external device 300 notifies the user of the determination result by a predetermined method. Thus, the user can understand whether an abnormality occurs in the gear motor 2. In addition, the processing unit 200 outputs the determination value based on the diagnosis method set by the diagnosis setting information and a determination value based on a diagnosis method that is not set by the diagnosis setting information to the second interface 202, to then transmit the determination value based on the diagnosis method set by the diagnosis setting information and the determination value based on the diagnosis method that is not set by the diagnosis setting information to the second interface 202 to the determination result to the second external device 400. Thus, even in a case where "none", "peak value" or "effective value" is set in a diagnosis method, it is possible to display both of a peak value and an effective value as shown in FIG. 5. Further, even in a case where "none" or "effective value" is set in a diagnosis method, it is possible to display a trend graph of a peak value as shown in FIG. 6, and even in a case where "none" or "peak value" is set in a diagnosis method, it is possible to display a trend graph of an effective value.

According to the failure diagnosis system 10 according to the above-described embodiment, a determination result based on a diagnosis method set by diagnosis setting information is output to the first interface 201 that is the first output portion. Thus, it is possible to recognize whether or not an abnormality occurs in the gear motor 2. On the other hand, a determination value based on a diagnosis method that is not set by the diagnosis setting information, in addition to the determination value based on the diagnosis method set by the diagnosis setting information, are output to the second interface 202 that is the second output portion. Thus, it is possible to acquire determination values based on various diagnosis methods, regardless of details that are set in advance, and thus, it is possible to specifically confirm the state of the gear motor 2. Namely, according to the failure diagnosis system 10 according to the embodiment, convenience is enhanced.

According to the failure diagnosis system 10 according to the embodiment, on the diagnosis result screen in FIG. 5, the height of an abnormality threshold of each channel is set (that is, to 100%), and determination values are displayed as proportions thereto. Thus, it is possible to recognize at a glance whether a determination value exceeds the abnormality threshold. Further, it is possible to intuitively recognize the state of the gear motor 2 corresponding to each channel.

Further, according to the failure diagnosis system 10 according to the embodiment, on the diagnosis result screen in FIG. 5, in a case where a pointer is pointed to a bar graph of a peak value, the peak value is displayed in a pop-up form, and in a case where the pointer is pointed to a bar graph of an effective value, the effective value is displayed in a pop-up form. Thus, the user easily can check the peak value or the effective value.

Hereinabove, the failure diagnosis system according to the embodiments has been described. The embodiments are merely examples, and it can be understood by those skilled in the art that various modification examples may be made by combination of respective components or respective processes and the modification examples are also included in the scope of the invention. Hereinafter, modification examples will be described.

Modification Example 1

In the embodiments, a configuration in which the second external device 400 includes the diagnosis setting information setting portion 410 has been described, but the invention is not limited thereto. For example, a configuration in which the processing unit 200 includes the diagnosis setting information setting portion 410 may be used. In this case, the processing unit 200 may provide the diagnosis setting screen shown in FIG. 2. Further, for example, a configuration in which an external device other than the first external device 300 or the second external device 400 includes the diagnosis setting information setting portion 410 may be used. In this case, the external device may provide the diagnosis setting screen shown in FIG. 2.

Modification Example 2

In the embodiments, a configuration in which the processing unit 200 outputs a determination value based on each determination method to the second interface 202 has been described, but the invention is not limited thereto. For example, a configuration in which the processing unit 200 additionally outputs vibration information to the second external device 400 through the second interface 202 may be used. In this case, a user can perform more detailed analysis.

Modification Example 3

In the embodiments, a configuration in which the failure diagnosis system 10 determines whether an abnormality occurs in the gear motor 2 on the basis of vibration generated in the gear motor 2 has been described, but the invention is not limited thereto, and a variety of information may be used. For example, a configuration in which the failure diagnosis system 10 diagnoses whether an abnormality occurs in the gear motor 2 may be used, on the basis of at least one of a motor current, a temperature, or an iron powder concentration of a lubricating oil in the gear motor 2, instead of vibration that is generated in the gear motor 2 or in addition to the vibration that is generated in the gear motor 2, may be used. That is, instead of vibration information, or in addition to the vibration information, at least one of information relating to the motor current, the temperature, or the iron powder concentration of the lubricating oil may be set as diagnosis target information. This is similarly applied to a diagnosis target device other than the gear motor 2. That is, the failure diagnosis system 10 may use any diagnosis target information suitable for determining an abnormality of any diagnosis target device.

Modification Example 4

A determination value is not limited to a peak value or an effective value, and any value capable of determining an abnormality may be used. For example, a value obtained by performing FFT (Fast Fourier Transform) with respect to vibration information may be used.

Modification Example 5

In a case where "none" is set in a diagnosis method, the processing unit 200 may not perform determination of whether an abnormality occurs in the gear motor 2. Alternatively, the processing unit 200 may perform the determination, but may not output the determination result to the first external device 300.

Modification Example 6

In the embodiments, a configuration in which three sensors 100 are connected to the processing unit 200 has been described, but the number of sensors 100 connected to one processing unit 200 is not particularly limited. For example, one or two sensors, or four or more sensors may be connected.

Any combination of the above-described embodiments and modification examples is also useful as an embodiment of the invention. New embodiments based on the combinations show combinations of respective effects of embodiments and modification examples to be combined.

It should be understood that the invention is not limited to the above-described embodiment, but may be modified into various forms on the basis of the spirit of the invention. Additionally, the modifications are included in the scope of the invention.

What is claimed is:

1. A failure diagnosis system comprising:
    a sensor that is configured to detect diagnosis target information of a diagnosis target device;
    a setting portion that is configured to set a type of a determination value to be used for determination of whether an abnormality occurs in the diagnosis target device from among a plurality of types of determination values based on the diagnosis target information; and
    a diagnosis unit that comprises:
        a determination value specifying portion that is configured to specify the plurality of types of the determination values based on the diagnosis target information acquired by the sensor regardless of details set by the setting portion,
        a determination portion that is configured to determine whether the abnormality occurs in the diagnosis target device on the basis of the determination value of the type set by the setting portion,
        a first output portion that is configured to output a determination result in the determination portion to a first external device provided separately from the diagnosis unit, and
        a second output portion that is configured to output the plurality of types of the determination values specified by the determination value specifying portion regardless of the details set by the setting portion to a second external device provided separately from the diagnosis unit and the first external device.

2. The failure diagnosis system according to claim 1, wherein the second external device sets reference thresholds with respect to respective types of determination values, and displays proportions, with respect to the reference thresholds, of the respective types of determination values received from the second output portion.

3. The failure diagnosis system according to claim 2, wherein the second external device points a pointer on a proportion display to display a numerical value of the determination value.

4. The failure diagnosis system according to claim 1, wherein the second output portion outputs the diagnosis target information detected by the sensor to the second external device.

5. The failure diagnosis system according to claim 1, wherein the setting portion is able to perform a non-diagnosis setting, and
wherein in a case where the non-diagnosis setting is performed, the diagnosis unit does not perform the output in the first output portion and performs the output in the second output portion.

6. The failure diagnosis system according to claim 1, wherein the diagnosis target device is a gear motor, and
wherein the first external device is a control management device for controlling the gear motor.

7. The failure diagnosis system according to claim 1, wherein the second external device comprises the setting portion, and
wherein the second external device transmits the details set by the setting portion to the diagnosis unit.

8. The failure diagnosis system according to claim 1, wherein the setting portion is able to set, as the determination value, a peak value which is a distance between a maximum value and a minimum value in amplitude of the diagnosis target information within a predetermined measurement time, or an effective value which is a square mean of the diagnosis target information within the predetermined measurement time.

9. The failure diagnosis system according to claim 1, wherein the setting portion is able to set a plurality of the determination values as the determination value to be used for determination of whether an abnormality occurs in the diagnosis target device.

* * * * *